United States Patent [19]

Jung et al.

[11] Patent Number: 5,300,571
[45] Date of Patent: Apr. 5, 1994

[54] HARDENABLE COMPOSITION BASED ON A MICHAEL ADDITION PRODUCT, PROCESS FOR ITS PREPARATION AND ITS USE

[75] Inventors: Werner A. Jung, Ascheberg; Peter Hoffmann, Münster, both of Fed. Rep. of Germany

[73] Assignee: BASF Lacke+Farben Aktiengesellschaft, Munster, Fed. Rep. of Germany

[21] Appl. No.: 663,826

[22] PCT Filed: Aug. 11, 1989

[86] PCT No.: PCT/EP89/00950

§ 371 Date: Mar. 26, 1991

§ 102(e) Date: Mar. 26, 1991

[87] PCT Pub. No.: WO90/03404

PCT Pub. Date: Apr. 5, 1990

[30] Foreign Application Priority Data

Sep. 28, 1988 [DE] Fed. Rep. of Germany ....... 3832958

[51] Int. Cl.⁵ .................................................. C08L 61/00
[52] U.S. Cl. ....................................... 525/153; 525/303
[58] Field of Search ................................. 525/153, 303

[56] References Cited

U.S. PATENT DOCUMENTS

| 4,198,331 | 4/1980 | Buchwalter et al. | 525/396 |
| 4,596,844 | 6/1986 | Ohsawa et al. | 528/121 |
| 4,988,760 | 1/1991 | Jung et al. | 525/379 |
| 5,115,064 | 5/1992 | Jung et al. | 525/379 |

Primary Examiner—James J. Seidleck
Assistant Examiner—Thomas Hamilton, III

[57] ABSTRACT

The invention relates to a hardenable composition containing
A) compounds having at least two activated double bonds (I) based on $\alpha,\beta$-unsaturated carbonyl compounds, $\alpha,\beta$-unsaturated carboxylic acid esters or $\alpha,\beta$-unsaturated nitrile groups,
B) compounds containing either at least one primary amino group which is blocked by an aldehyde or ketone having not more than 10 C atoms or at least 2 groups which can be hydrolyzed to NH groups, and
C) customary additives, if appropriate catalysts, if appropriate pigments and organic solvents.

Either component A or component B or components A and B are based on a branched soluble acrylate copolymer P, which is obtainable by copolymerization of
a) 5 to 30% by weight of monomers having at least two ethylenically unsaturated polymerizable double bonds,
b) 5 to 60% by weight of monomers having a functional group and
c) 5 to 90% by weight of other ethylenically unsaturated monomers, the sum of a, b and c being 100% by weight.

The invention also relates to processes for the preparation of the hardenable composition and its use.

20 Claims, No Drawings

HARDENABLE COMPOSITION BASED ON A MICHAEL ADDITION PRODUCT, PROCESS FOR ITS PREPARATION AND ITS USE

BACKGROUND OF THE INVENTION

The invention relates to a hardenable composition containing
- A) compounds having at least two activated double bonds (I) based on $\alpha,\beta$-unsaturated carbonyl compounds, $\alpha,\beta$-unsaturated carboxylic acid esters or $\alpha,\beta$-unsaturated nitrile groups,
- B) compounds containing either at least one primary amino group which is blocked by an aldehyde or ketone having not more than 10 C atoms or at least 2 groups which can be hydrolyzed to NH groups, and
- C) customary additives, if appropriate catalysts, if appropriate pigments and organic solvents.

The present invention also relates to processes for the preparation of these compositions and their use.

Compositions which are obtained by reaction of compounds having at least two activated double bonds (I) with compounds containing active hydrogen atoms are known from EP 160,824. These compositions react under the influence of bases to give a Michael addition product. The Michael acceptor component can be derived, for example, from acrylate resins containing hydroxyl groups, epoxy resins, oligomeric polyols or oligomeric polyamines. The Michael donor component can be derived, for example, from polyols, polyamines or polymercaptans The binders described in EP 160,824 can be used as two-component systems for coatings. They readily harden under catalysis of bases at room temperature and at elevated temperatures. The advantages of the systems described is that they do not require free isocyanates for hardening. However, the known systems have disadvantages in respect of the stability to solvents, resistance to chemicals and elasticity of the coatings obtained from them.

Compositions which are obtained by reaction of compounds having at least two activated double bonds with compounds which contain at least one primary amino group and are blocked by an aldehyde or ketone are known from EP 230,296. These compositions react under the influence of atmospheric moisture at various temperatures to give a Michael addition product. However, these compositions are in need of improvement in respect of the stability to solvents and resistance to chemicals of the coatings produced from them. Another disadvantage of these compositions is the high solvent content of the coating compositions caused by the high viscosity of the binder solutions, since it leads to high pollution of the environment by solvents during drying of the lacquer films.

Hardenable compositions which contain compounds A having at least two activated double bonds and compounds B having active hydrogen atoms are described in the prior, previously unpublished Patent Application DE 3, 710 431. These compositions react under the influence of bases to give a Michael addition product. At least one of the compounds A and B is based on a branched acrylate copolymer P which is soluble in organic solvents. In contrast to the present application, exclusively carbonyl compounds selected from the group comprising acetoacetic acid, cyanoacetic acid, malonic acid, cyclopentanonecarboxylic acid, cyclohexanonecarboxylic acid and the particular alkyl esters and reaction products of these carbonyl compounds with acrylate copolymers containing hydroxyl and glycidyl groups are employed as compound B. Compounds B containing amino groups are not described.

EP-A-158 161 describes coating compositions which harden at low temperatures and are based on branched acrylate copolymers containing hydroxyl groups and melamine-formaldehyde resins or polyisocyanates as crosslinking agents. 3 to 25% by weight of monomers having at least two polymerizable olefinically unsaturated double bonds are employed in the polymerization for the preparation of the acrylate copolymer. The coating agents based on the systems described have a good stability towards benzene and a good stability towards long-term exposure to water or water vapor. However, the melamine-formaldehyde resins or polyisocyanates employed as crosslinking agents have an adverse effect for toxicological reasons.

The invention was thus based on the object of providing coating compositions which can be hardened at low temperatures and therefore can preferably be employed in automobile repair lacquering and are largely free from isocyanate. In particular, these coating compositions should lead to lacquer films with—in respect of the systems of EP 160 824 and EP 230 296—improved stability to solvents and resistance to chemicals. These coating compositions should furthermore have the maximum possible solids content at a viscosity, which is favorable for processing, of 16 to 20 s, measured in a flow cup in accordance with DIN 4° at 23° C.

SUMMARY OF THE INVENTION

Surprisingly, this object is achieved by a hardenable coating composition which contains
- A) compounds having at least two activated double bonds (I) based on $\alpha,\beta$-unsaturated carbonyl compounds, $\alpha,\beta$-unsaturated carboxylic acid esters or $\alpha,\beta$-unsaturated nitrile groups,
- B) compounds containing either at least one primary amino group which is blocked by an aldehyde or ketone having not more than 10 C atoms or at least 2 groups which can be hydrolyzed to NH groups, and
- C) customary additives, if appropriate catalysts, if appropriate pigments and organic solvents, wherein either component A or component B or components A and B are based on a branched soluble acrylate copolymer P which is obtainable by copolymerization of
  - a) 5 to 30% by weight of monomers having at least two ethylenically unsaturated polymerizable double bonds,
  - b) 5 to 60% by weight of monomers having a functional group and
  - c) 5 to 90% by weight of other ethylenically unsaturated monomers, the sum of a, b and c being 100% by weight.

DETAILED DESCRIPTION OF THE INVENTION

The compounds A are compounds which contain activated olefinically unsaturated groups and can be used as a Michael acceptor. Component B comprises compounds which contain either at least one primary amino group—blocked by ketones or aldehydes—or at least 2 groups which can be hydrolyzed to give NH groups, and which can be used as a Michael donor. According to the invention, at least one of components A and B should be based on the branched soluble acrylate copolymer P, that is to say be obtainable from this. According to the invention, component A can thus be obtainable by reaction of the branched soluble acrylate copolymer P with a compound (1) which contains at least one activated double bond (I). It is also possible for component B to be obtainable by reaction of the branched soluble acrylate copolymer P with a compound (2) which, in addition to a group which is capable of reacting with the acrylate copolymer P, contains at least one primary amino group, which is blocked with a ketone or aldehyde having not more than 10 C atoms, or at least 2 groups which can be hydrolyzed to give NH groups.

The soluble branched acrylate copolymer P having a number-average molecular weight of 1,500 to 5,000 (weight-average 6,000 to 100,000) is thus employed according to the invention as the precursor for the compounds A and/or B. The branched acrylate copolymer is obtainable by copolymerization a) of 5 to 30% by weight, based on the total weight of the monomers, of monomers having at least two ethylenically unsaturated double bonds.

Compounds which can advantageously be used as component a are those of the general formula

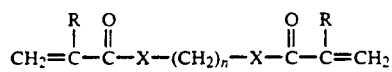

where
R=H or $CH_3$,
X=O, NR'or S, where R'=H, alkyl or aryl and n=2 to 8.

Examples of such compounds are hexanediol diacrylate, hexanediol dimethacrylate, glycol diacrylate, glycol dimethacrylate, butanediol diacrylate, butanediol dimethacrylate, trimethylolpropane triacrylate and trimethylolpropane trimethacrylate Divinyl compounds, such as, for example, divinylbenzene, are furthermore also suitable as component a. It is of course also possible to use mixtures of polyfunctional monomers.

Component a) can also be a reaction product of a carboxylic acid having a polymerizable olefinically unsaturated double bond and glycidyl acrylate and/or glycidyl methacrylate. Component a) can furthermore be an esterification product between an unsaturated alcohol containing a polymerizable double bond and a polycarboxylic acid or unsaturated monocarboxylic acid.

Reaction products of a polyisocyanate with alcohols or amines containing unsaturated polymerizable double bonds are advantageously employed as component a). An example which may be mentioned here is the reaction product of one mole of hexamethylene diisocyanate and two moles of allyl alcohol.

A further advantageous component a) is a diester of polyethylene glycol and/or polypropylene glycol having an average molecular weight of less than 1,500, preferably less than 1,000, and acrylic acid and/or methacrylic acid.

Monomers having a functional group are used as component b), the choice of this functional group depending on the nature of the compounds (1) and (2); At least one of compounds A and B is obtained by reaction of that functional group of the soluble branched acrylate copolymer P with compound (1) or (2), respectively. The monomers that can be used for component b) will be dealt with later.

The other polymerizable monomers of component c can advantageously be chosen from the group comprising styrene, vinyltoluene, alkyl esters of acrylic acid and of methacrylic acid, alkoxyethyl acrylates and aryloxyethyl acrylates and the corresponding methacrylates and esters of maleic, crotonic, isocrotonic, vinylacetic and fumaric acid. Further examples which may be mentioned are methyl acrylate, ethyl acrylate, propyl acrylate, butyl acrylate, isopropyl acrylate, isobutyl acrylate, pentyl acrylate, isoamyl acrylate, hexyl acrylate, 2-ethylhexyl acrylate, octyl acrylate, 3,5,5-trimethylhexyl acrylate, decyl acrylate, dodecyl acrylate, hexadecyl acrylate, octadecyl acrylate, octadecenyl acrylate, pentyl methacrylate, isoamyl methacrylate, hexyl methacrylate, 2-ethylhexyl methacrylate, octyl methacrylate, 3,5,5-trimethylhexyl methacrylate, decyl methacrylate, dodecyl methacrylate, hexadecyl methacrylate, octadecyl methacrylate, butoxyethyl acrylate, butoxyethyl methacrylate, methyl methacrylate, ethyl methacrylate, propyl methacrylate, isopropyl methacrylate, butyl methacrylate, isobutyl methacrylate, cyclohexyl acrylate, cyclohexyl methacrylate, acrylonitrile, methacrylonitrile, vinyl acetate, vinyl chloride, phenoxyethyl methacrylate and phenoxyethyl acrylate. Other monomers can be employed as long as they do not lead to undesirable properties of the copolymer. The choice of monomers for component c largely depends on the desired properties of the acrylate copolymer in respect of elasticity, hardness, compatibility and polarity. These properties can be controlled in part by proper selection of monomers for component c) with the aid of the known glass transition temperatures of the monomers.

Component b) of the acrylate copolymer can advantageously be an ethylenically unsaturated monomer containing hydroxyl groups. Examples of these are hydroxyalkyl esters of acrylic acid and/or methacrylic acid having a primary hydroxyl group. Component b) can also be at least in part a reaction product of one mole of hydroxyethyl acrylate and/or hydroxyethyl methacrylate and on average two mole of ε-caprolactone. However, hydroxyl-containing esters of acrylic acid and/or methacrylic acid having a secondary hydroxyl group can also be employed as the monomers containing hydroxyl groups. These are advantageously reaction products of acrylic acid and/or methacrylic acid with the glycidyl ester of a carboxylic acid having a tertiary α-carbon atom. Examples of ethylenically unsaturated monomers containing hydroxyl groups are hydroxyethyl acrylate, hydroxypropyl acrylate, hydroxybutyl acrylate, hydroxyamyl acrylate, hydroxyhexyl acrylate, hydroxyoctyl acrylate and the corresponding methacrylates. Examples of OH monomers having a secondary OH group are 2-hydroxypropyl acrylate, 2-hydroxybutyl acrylate, 3-hydroxybutyl acrylate and the corresponding methacrylates.

Advantageous compositions according to the invention are those in which component A is based on a soluble crosslinked acrylate copolymer, wherein component b) is a monomer containing hydroxyl groups, and the compound (1) is a monoester of α,β-unsaturated carboxylic acids. In this case, the branched copolymer containing hydroxyl groups is reacted with monoesters of α,β-unsaturated carboxylic acids in a transesterification reaction after the polymerization, so that a branched polyacrylate having free olefinically unsaturated double bonds is obtained. The resulting compound A can then be combined with the compounds B to give a Michael addition product. Possible compounds (1) which are advantageous in this case are esters of α,β-unsaturated carboxylic acids, the ester groups of which have not more than 4 to 6 carbon atoms, such as, for example, methyl acrylate, ethyl acrylate, propyl acrylate, butyl acrylate, isopropyl acrylate, isobutyl acrylate, pentyl acrylate, the corresponding methacrylates and the corresponding esters of fumaric acid, maleic acid, crotonic acid and dimethylacrylic acid. The compounds (1) are reacted with the OH groups of the branched acrylate copolymer P in known transesterification reactions.

Further methods for the preparation of component A are described below:

Component A is advantageously based on a soluble pre-crosslinked acrylate copolymer P, component b of which is a monomer containing hydroxyl groups, the acrylate copolymer containing hydroxyl groups being reacted with an α,β-unsaturated carboxylic acid (compound (1)). In this case, component A is obtained by esterification of a branched acrylate copolymer containing hydroxyl groups with an unsaturated carboxylic acid.

Component A can furthermore advantageously be prepared by reaction of the previously described acrylate copolymer P containing hydroxyl groups with a compound having at least one activated double bond (I) and an isocyanate group. The reaction between this compound (1) and the branched acrylate copolymer in this case takes place with the formation of a urethane bond. The compound (1), which contains an isocyanate function in addition to the group (I), is advantageously an isocyanatoalkyl ester of an unsaturated carboxylic acid of the general formula

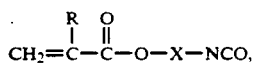

where R=H, CH$_3$ or C$_2$H$_5$
and X=(CH$_2$)$_n$, where n=1–12. Compound (1) can also be m-isopropenyl-α,β-dimethylbenzyl isocyanate, or be chosen from the group comprising reaction products of diisocyanates with OH—, NH—, SH— or COOH-functional derivatives of acrylic acid, methacrylic acid, fumaric acid, maleic acid, crotonic acid and dimethylacrylic acid.

Alternatively, the branched acrylate copolymer containing hydroxyl groups may be reacted with a compound (1) having the general formula

where
R=H or CH$_3$,
R$^1$=H, alkyl or aryl,
R$^2$=alkyl and

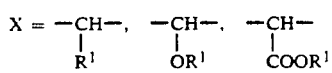

Examples of such compounds are methoxymethylacrylamide, methoxymethylmethacrylamide, butoxymethylacrylamide, butoxymethylmethacrylamide, isobutoxymethylacrylamide, isobutoxymethylmethacrylamide, analogous amides of fumaric acid, crotonic acid and dimethylacrylic acid and glycolic acid derivatives, such as methylacrylamidoglyc-olate methyl ether, butylacrylamidoglycolate butyl ether, methylacrylamidoglycolate and butylacrylamidoglycolate.

Component A, which is based on a branched soluble acrylate copolymer and contains at least two activated double bonds, can also be prepared by reaction of an acrylate copolymer containing epoxide groups and a compound (1) containing a carboxyl or amino group. In this case, a monomer containing epoxide groups is employed as the monomer b) for the preparation of the acrylate copolymer P, such as, for example, glycidyl esters of unsaturated carboxylic acids or glycidyl ethers of unsaturated compounds. Examples which may be mentioned of component b) are: glycidyl acrylate, glycidyl methacrylate, glycidyl esters of maleic and fumaric acid, glycidyl vinyl phthalate, glycidyl allyl phthalate and glycidyl allyl malonate. The epoxide groups of the acrylate copolymer are then reacted with the carboxyl or amino groups of the compound (1). The compound (1) is advantageously chosen from the group comprising acrylic acid, methacrylic acid, crotonic acid, dimethylacrylic acid, monomethyl fumarate and reaction products of carboxylic anhydrides and hydroxyalkyl esters of α,β-unsaturated acids, such as adducts of hexahydrophthalic anhydride, phthalic anhydride, tetrahydrophthalic anhydride or maleic anhydride with hydroxyethyl (meth)acrylate, hydroxypropyl (meth)acrylate or hydroxybutyl (meth)acrylate. The compound (1) can furthermore be t-butylaminoethyl (meth)acrylate, bisacrylamidoacetic acid or bis(acrylamidoethyl)amine. Compounds with several activated double bonds, such as, for example, bisacrylamidoacetic acid, are particularly preferably employed.

The branched soluble acrylate copolymer P can be synthesized with a monomer b) having ester functionality. The esterification alcohol should preferably contain not more than 6 carbon atoms. To prepare component A, the acrylate copolymer prepared in this manner is reacted with a compound (1) which, in addition to group (I) contains an OH, NH or SH group. Possible components b) are alkyl esters of acrylic acid, methacrylic acid, crotonic acid and maleic and fumaric acid, such as, for example, the corresponding methyl, ethyl, propyl, isopropyl, butyl, isobutyl and pentyl esters. Longer-chain alcohol radicals in the ester group are less favorable, since their transesterification and removal by distillation after the transesterification requires temperatures which are too high. Aminoalkyl esters of the α,β-unsaturated carboxylic acids mentioned are moreover suitable. Component A is then obtained by transesterification or transamidation reactions. These reactions are known to the expert and require no further explanation.

It is also possible to employ branched acrylate copolymers containing isocyanate groups for the preparation of component A. In this case, monomers containing NCO groups are employed as monomer b). The resulting acrylate copolymer containing isocyanate groups is then reacted with compounds (1) which, in addition to the group (I), contain OH, NH, SH or COOH groups. In this case, the monomers b) can be chosen from the group comprising vinylic isocyanates, such as, for example, vinyl isocyanate and m-isopropenyl-α,α- dimethylenebenzyl isocyanate, and isocyanatoalkyl esters of α,β-unsaturated carboxylic acids, of the general formula

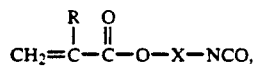

wherein R=H, CH$_3$ or C$_2$H$_5$ and X=(CH$_2$)$_n$, where n=1-12.

Adducts, for example of isophorone diisocyanate and hydroxyalkyl (meth)acrylates, such as, for example, hydroxyethyl methacrylate, can also be employed as component b). It is advantageous for the addition of those compounds which, in addition to the OH, NH, SH or COOH group, contain two or more structural elements (I) to be chosen. Two or more double bonds of the type (I) are in this way introduced with one addition step. This is favorable to the extent that on addition of hydroxyl groups onto isocyanate groups, urethane or urea group are formed, which in general greatly increase the viscosity of the binders, which is not always desirable. Examples which may be mentioned for this are the reaction products of acrylic acid or methacrylic acid or of another α,β-ethylenically unsaturated carboxylic acid and glycidyl acrylate or glycidyl methacrylate. A free hydroxyl group is formed by this reaction, and is then added onto the NCO groups of the acrylate copolymer. The monomer component for the preparation of the acrylate copolymer can advantageously be an amide, containing alkoxymethyl groups, of an α,β-unsaturated carboxylic acid or of a compound of the general formula

where R=H or CH$_3$,
R$^1$=H, alkyl or aryl,
R$^2$=alkyl and

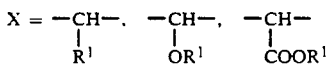

In this case, compounds which, in addition to the group (I), contain OH, NH or SH groups are employed as the compound (1). Examples of the monomers b are N-alkoxymethyl(meth)acrylamides, such as methoxymethylacrylamide, methoxymethylmethacrylamide, isobutoxyacrylamide, isobutoxymethacrylamide and isobutoxymethylmethacrylamide. The alkoxy(meth)acrylamidoglycolate alkyl ethers are also suitable.

The compounds B are compounds which contain either at least one primary amino group which is blocked by an aldehyde or ketone having not more than 10 carbon atoms or at least 2 groups which can be hydrolyzed to give NH groups, and which can be used as a Michael donor.

Examples of suitable compounds, which are employed in aldiminized or ketiminized form are aliphatic and/or cycloaliphatic amines having at least one, preferably two to four, primary amino groups and 2 to 24 C atoms. They preferably have number-average molecular weights below 700. They preferably also contain 0 to 4 secondary amino groups. Alkanolamines are furthermore also preferred.

Examples of suitable amines are ethylenediamine, tri-, tetra-, penta-, hexa-, hepta-, nona-, deca- and dodecamethylenediamine, 2,2,4- and 2,4,4-trimethylhexamethylenediamine, propylenediamine, 1,3- and 1,4-butylenediamine, isophoronediamine, 1,2- and 1,4-diaminocyclohexane, 4,4'-diaminodicyclohexylmethane, bis-(3-methyl-4-aminocyclohexyl)-methane, 2,2-bis-(4-aminocyclohexyl)propane,4,7-dioxadecane-1,10-diamine,4,9-dioxadodecane-1,12-diamine, 7-methyl-4,10-dioxatridecane-1,13-diamine, nitrilotris(ethaneamine), ethanolamine, propanolamine, N-(2-aminoethyl)-ethanol, polyether-polyamines, bis-(3-aminopropyl)-methylamine, 3-amino-1-methylaminopropane, 3-amino-1-(cyclohexylamino)-propane, N-(2-hydroxyethyl)ethylenediamine, tris-(2-aminoethyl)-amine and polyamines of the formula H$_2$N—(R$_2$—NH)$_n$—R$_1$—NH$_2$. n is an integer between 1 and 6, preferably 1-3, and R$_1$ and R$_2$ are identical or different alkylene groups or cycloalkylene groups or alkylene groups containing ether groups, having 2-6, preferably 2-4, C atoms. Examples of such polyalkylenepolyamines are diethylenetriamine, triethylenetetramine, tetraethylenepentamine, dipropylenetriamine, tripropylenetetramine, tetrapropylenepentamine and dibutylenetriamine. Diethylenetriamine is particularly preferred. The iminized compounds described in EP 203,296 are also suitable as component B. These compounds have a primary amino group blocked by an aldehyde or ketone having not more than 10 C atoms. The compounds are products of the reaction between OH, NH, or SH groups on the imino molecule and monoisocyanate, monoepoxide, or monofunctional α,β-unsaturated carbonyl compounds. Reference is made to EP 203,296 for further details. Cycloaliphatic amines having 5 to 15 C atoms, such as, for example, isophoronediamine, 4,4'-dicyclohexylmethanediamine and 3,3'-dimethyl-4,4'-dicyclohexylmethanediamine, are preferably employed for the preparation of this component. Reaction products of alkanolamines, mercaptylamines or primary amines which in addition also have an NH group with di- and polyisocyanates, di- and polyepoxides and α,β-unsaturated carbonyl compounds are moreover suitable as component B.

Examples of di- or polyisocyanates which ar suitable are: aromatic isocyanates, such as, for example, toluylene 2,4- and 2,6-diisocyanate and mixtures thereof, diphenylmethane 4,4'-diisocyanate, m-phenylene, p-phenylene, diphenyl 4,4'- naphthalene 1,5-, naphthalene 1,4-, toluidine 4,4'- and xylylene diisocyanate, and substituted aromatic systems, such as, for example, dianisidine diisocyanates, diphenyl ether 4,4'-diisocyanates or chlorodiphenylene diisocyanates, and aromatic isocyanates of higher functionality, such as, for example, 1,3,5-triisocyanatobenzene, 4,4',4''-triisocyanatotriphenylmethane, 2,4,6-triisocyanatotoluene and 4,4'-diphenyldimethylmethane-2,2',5,5'-tetraisocyanate; cycloaliphatic isocyanates, such as, for example, cyclopentane 1,3-cyclohexane 1,4-, cyclohexane 1,2- and isophorone diisocyanate; and aliphatic isocyanates, such as, for example, trimethylene, tetramethylene, pentamethylene, hexamethylene and trimethylhexamethylene 1,6-diisocyanate and tris-hexamethylene triisocyanate.

Examples of suitable α,β-unsaturated carbonyl compounds are, inter alia, α,β-unsaturated dicarboxylic acids or esters thereof, for example maleic and fumaric acid.

Reference is made to EP 203,296 for further details of amine adducts which are suitable as component B.

As already mentioned, the abovementioned amines are employed in the form of the iminized compounds in the compositions according to the invention, that is to say the primary amino groups are blocked by reaction with an aldehyde or ketone having not more than 10 C atoms, preferably 3-8 C atoms. Ketones are preferably employed. Examples of suitable aldehydes and ketones are acetone, methyl ethyl ketone, diethyl ketone, methyl isopropyl ketone, methyl isobutyl ketone, isobutyraldehyde, 2-pentanone, cyclohexanone, ethyl amyl ketone, diisobutyl ketone, 3-octanone and decanone. Methyl isobutyl ketone and ethyl amyl ketone are especially preferably employed. This blocking reaction is known (compare EP 203,296) and does not need to be described in more detail.

Component B, which serves as a Michael donor, can of course also be based on the branched acrylate copolymer, which is soluble in organic solvents. Some methods for the preparation of component B which is obtained from an acrylate copolymer having a functional group and compound (2) are described below.

The soluble branched acrylate copolymer preferably contains hydroxyl groups, which are preferably introduced into the acrylate copolymer by using hydroxyalkyl esters of α,β-unsaturated carboxylic acids as monomer b. These acrylate copolymers containing hydroxyl groups are reacted with compounds (2) which contain, per molecule, at least one primary amino group blocked by aldehydes or ketones having not more than 10 C atoms and on average 0.8 to 1.5, preferably 1, free isocyanate group. The amount of compound (2) here is chosen so that the resin formed has an amine number of 30 to 200 mg of KOH/g, preferably 60 to 150 mg of KOH/g. This reaction of the acrylate copolymer containing hydroxyl groups with the compounds (2) is carried out in a solvent which is inert towards isocyanates, at temperatures of 10° to 100° C., preferably 50° to 80° C., if appropriate in the presence of organic tin compounds as catalysts, up to an NCO value of practically zero.

The compounds (2) are prepared by reaction of diisocyanates or polyisocyanates with less than the stoichiometric amount of one or more polyamines having at least one primary amino group which is blocked by an aldehyde or ketone having not more than 10 C atoms and a group which is reactive towards isocyanate groups. Examples of suitable amines are the alkanolamines having at least 4 C atoms, which have already been listed on page 16 of this description, amines having mercaptan groups and polyamines, preferably with amino groups of different reactivity. The alkanolamines are preferably employed. The primary amino group of these compounds has been blocked by aldehydes or ketones having not more than 10 C atoms before the reaction with the isocyanates.

Examples of di- and polyisocyanates which are suitable for the preparation of compound (2) are the compounds already listed on page 17/18 of this description. Diisocyanates having isocyanate groups of different reactivity, such as, for example, isophorone diisocyanate, are preferably employed.

Another possibility comprises employing branched acrylate copolymers P containing isocyanate groups for the preparation of component B. In this case, monomers containing NCO groups, such as, for example, the compounds listed on page 13 of this description, are employed as monomer b. This acrylate copolymer P containing isocyanate groups is then reacted with compounds (2) which, in addition to the iminized primary amino groups, contain OH, NH or SH groups. Examples of such compounds are listed on page 15 of this description.

There is also the possibility of reacting acrylate copolymers P containing glycidyl groups, which can be prepared by using monomers b having glycidyl groups—as explained on page 12/13 of this description - with compounds (2) which, in addition to the iminized amino group (II), contain an NH group. Examples of suitable compounds (2) are listed on page 15 of this description. It is also possible to prepare acrylate copolymers P using monomers b) containing carboxyl groups. Component B is then formed by reacting the carboxyl groups with compounds (2) having epoxy groups. These compounds (2) are the reaction products of polyepoxides having n moles of epoxide groups with (n=1) moles compounds (3), which compounds (3) contain both the iminized amino groups (II) and NH groups. Examples of suitable compounds (3) are listed, for example, on page 15/16. Examples of suitable epoxide-amine adducts (2) are also listed in EP 203,296.

Finally, there is also the possibility of employing compounds which contain at least 2 groups which ca be hydrolyzed to give NH groups as component B. Reference is made to EP 160,824 for further details.

The invention also relates to a process for the preparation of a hardenable composition containing A) compounds having at least two activated double bonds (I) based on α,β-unsaturated carbonyl compounds, α,β-unsaturated carboxylic acid esters or α,β-unsaturated nitrile groups, B) compounds containing either at least one primary amino group which is blocked by an aldehyde or ketone having not more than 10 C atoms or at least 2 groups which can be hydrolyzed to NH groups, and C) customary additives, if appropriate catalysts, if appropriate pigments and organic solvents, which comprises first preparing the soluble branched acrylate copolymer P by copolymerization of a) 5 to 30% by weight of monomers having at least two ethylenically unsaturated polymerizable double bonds, b) 5 to 60% by weight of monomers having a functional group and c) 5 to 90% by weight of other ethylenically unsaturated monomers, the sum of a, b and c being 100% by weight, in an organic solvent at 70° to 130° C., preferably at 90° to 120° C., using at least 0.5% by weight, preferably at least 2.5% by weight, based on the total weight of monomers a, b and c, of a polymerization regulator and using polymerization initiators to obtain a pre-crosslinked, non-gelled product. The soluble branched acrylate copolymer P is then reacted with a compound (1) having both a group than can react with P and at least one activated double bond (I), component A being obtained, and/or reacting the branched soluble acrylate copolymer P with a compound (2) with having both a group than can react with P and at least one primary amino group which is blocked by an aldehyde or ketone having not more than 10 C atoms, B being obtained. A or B, preferably A, is then processed in an organic solvent, if appropriate with pigments and customary additives, by mixing and if appropriate dispersing, to give a coating composition. Shortly before use, adding the other component (B or A) is added, if appropriate together with a catalyst, for hardening.

In the preparation of the acrylate copolymer P, it should be ensured that a pre-crosslinked but nongelled copolymer is obtained. This is possible by employing suitable polymerization conditions. By using monomers having at least two ethylenically unsaturated groups, precrosslinking of the acrylate copolymer is brought about, but because of the specific reaction conditions, this nevertheless does not lead to gelled products. It is important for the polymerization to be carried out at temperatures of 70° to 130° C., preferably at 90° to 120° C., with a relatively low polymerization solids content of about 40 to 65% by weight. If divinylbenzene is used as monomer a, however, it is also possible to carry out the polymerization at temperatures of up to 140° C. Compounds containing mercapto groups, preferably mercaptoethanol, are preferably used as polymerization regulators. The choice of regulator depends, in particular, on the nature of the monomer component b. If the monomer component b contains alkyl ester groups and is subsequently to be transesterified or transamidated with alcohols or amines, it is appropriate to employ minor amounts, if any, of mercaptoalcohols as regulators, since there is otherwise the risk of premature gelling during the transesterification or transamidation.

If monomer component b is an OH monomer and the resulting acrylate copolymer containing hydroxyl groups is to be reacted with a compound containing carboxyl groups in an esterification reaction, it is appropriate to use minor amounts, if any, of mercaptocarboxylic acids as regulators, since otherwise there is the risk of gelling. It should be mentioned here that, for example, 2-mercaptopropionic acid can nevertheless be employed in these cases, since this compound has a carboxyl group on a secondary saturated carbon atom and is thus less reactive than an $\alpha,\beta$-unsaturated carboxylic acid.

The monomers b must always be matched with the choice of regulator, and furthermore, for example, primary mercaptans and ethylenically unsaturated monomers having isocyanate groups, and ethylenically unsaturated monomers containing glycidyl groups and mercaptocarboxylic acids, as regulators, cannot be combined with one another.

The choice of polymerization initiator depends on the amount of ethylenically polyunsaturated monomers employed. If the amount is low, the initiators customary for such temperatures, such as, for example, peroxyesters, can be used. If the amount of ethylenically polyunsaturated monomers is higher, initiators, such as, for example, azo compounds, are preferably employed.

The reactions of the functional acrylate copolymer P with the compounds (1) and (2) which lead to the formation of components A and B are known to the expert, such as, for example, esterification reactions, transesterification reactions, transamidation reactions and addition reactions with the formation of urethane bonds, urea bonds and $\beta$-hydroxyester groups.

The hardenable compositions according to the invention furthermore contain customary additives and if appropriate pigments and organic solvents in the customary amounts.

Examples of customary additives are fillers, flow control agents, silicone oils, plasticizers, such as phosphoric acid esters and phthalic acid esters, additives which control the viscosity, delustering agents, UV absorbers and light stabilizers. These substances are preferably employed in amounts of 0.1 to 20% by weight, based on the total composition.

Examples of pigments which are added if appropriate are metallic pigments, such as, for example, aluminum platelet pigments and mica platelets coated with metal oxides (for example mica) as effect pigments, which are preferably employed in amounts of 0.1 to 30% by weight, based on the total composition. If appropriate, colored pigments can also be employed, preferably in amounts of 0.1 to 60% by weight, based on the total composition.

The hardenable compositions according to the invention harden in the temperature range from room temperature up to about 100° C., but can also be employed at higher temperatures.

As a result of the low hardening temperatures, they are particularly suitable for automobile repair lacquering.

Nevertheless, they can also be used as a clear lacquer, filler or top lacquer and as a base lacquer containing metallic pigments or as a clear lacquer of a multi-layer metallic lacquering.

These coating agents can be applied in the form of a film to a substrate by spraying, flooding, dipping, rolling, knife-coating or brushing, the film subsequently being hardened to give a firmly adhering coating.

The coatings obtained from the hardenable compositions have a very good stability to solvents and resistance to chemicals.

The invention is explained in more detail below with the aid of embodiment examples. All the data on parts and percentages are weight data. unless expressly stated otherwise.

Preparation of a branched acrylate copolymer P

The following component is initially introduced into a 4 liter stainless steel kettle and heated up to 110° C.: 677.3 parts of xylene.

The following components are weighed into the monomer tank and mixed:
120 parts of hexanediol diacrylate,
200 parts of hydroxyethyl methacrylate,
120 parts of ethylhexyl acrylate,
80 parts of cyclohexyl acrylate,
160 parts of tert.-butyl acrylate,
120 parts of styrene and
30 parts of mercaptoethanol.

The following components are weighed into the initiator tank and mixed: 16 parts of 2,2'-azobis(2-methylbutanenitrile) and 169 parts of xylene.

The contents of the monomer tank are metered in over a period of 3 hours and the contents of the initiator tank are metered in over a period of 3.5 hours. The initiator feed is started 10 minutes later than the monomer feed. The temperature is kept at 110° C. during the polymerization. When the feeds have ended, afterpolymerization is carried out for a further 3 hours. The acrylate resin solution thus obtained has a viscosity of 7.6 dPas (measured at 23° C.) and a solids content of 49.6% (60 minutes 130° C.).

Preparation of component A

After the acrylate copolymer solution P described above has been cooled to about 60° C., 477.5 parts of ethyl acrylate, 4.2 parts of hydroquinone and 8.5 parts of dibutyl-tin oxide are added. The solution is slowly heated to 80° C. A stream of air is continuously passed through the kettle during the reaction. When the solution has been kept at this temperature for 6 hours, the temperature is slowly increased to 120° C., ethanol being distilled off (over a column). The excess ethyl acrylate and a little solvent are then distilled off in vacuo.

The acrylate resin solution thus obtained has a viscosity of 3.4 dPas (measured at 23° C.) and a solids content of 56% (60 minutes, 130° C.).

Preparation of the ketimine component B

A solution of 232 parts of a ketimine of ethyl amyl ketone (5-methyl-3-heptanone) and diethylenetriamine, dissolved in 84 parts of ethyl amyl ketone, is initially introduced into a 2 liter glass kettle. A solution of 228 parts of a trimerized isophorone diisocyanate in 45.6 parts of xylene and 45.6 parts of 1-methoxypropyl 2-acetate is added dropwise to this solution in the course of 120 minutes. The reaction temperature is kept at 35°-40° C. The mixture is kept at 35° C. for a further 3 hours, until analysis of the reaction mixture by infra-red spectroscopy no longer shows free isocyanate. 13.0 parts of methoxypropanol are then added. The ketimine solution thus obtained has a solids content of 57% (60 minutes, 130° C.) and a viscosity of 6.4 dPas (at 23° C.).

Production and testing of a clear lacquer coating 25.89 parts of acrylate resin solution A and 7.74 parts of ketimine component B are mixed with one another and the mixture is brought to a flow viscosity of 25 seconds (DIN 4, 23° C.) with butyl acetate. The clear lacquer is knife-coated onto glass slabs in a wet film thickness of 200 µm and dried as stated:

Sample 1

After stoving at 100° C. for 30 minutes, the coated glass slabs are kept at room temperature for a further 24 hours and the mechanical properties of the resulting coating are then tested:
König pendulum hardness: 175 seconds
Petrol test *a)*: 0/0

Sample 2

After stoving at 60° C. for 30 minutes, the coated glass slabs are kept at room temperature for a further 4 days and the mechanical properties of the resulting coating are then tested:
König pendulum hardness: 100 seconds
Petrol test *a)*: 0/0 a: Felt platelets (∅5 cm) impregnated with commercially available high-octane petrol are left covered on the film for 5 minutes. The marking (0=no marking; 3=distinct marking) and the softening of the film (0=no softening; 3 =distinct softening) are then evaluated.

We claim:
1. A hardenable composition containing
A) compounds having at least two activated double bonds (I) based on α,β-unsaturated carbonyl compounds or α,β-unsaturated nitrile groups, and
B) compounds containing either at least one primary amino group (II) which is blocked by an aldehyde or ketone having not more than 10 C atoms or at least 2 groups which can be hydrolyzed to NH groups,
wherein either component A or component B or components A and B are obtained by the reaction of a compound (1) having at least one activated double bond (I) or compound (2) having at least one primary amino group (II) which is blocked by an aldehyde or ketone having not more than 10 C atoms or at least 2 groups which can be hydrolyzed to NH groups, or both compounds (1) and (2), respectively, with a branched acrylate copolymer P obtained by copolymerization of
a) 5 to 30% by weight of monomers having at least two ethylenically unsaturated polymerizable double bonds,
b) 5 to 60% by weight of monomers having a functional group reactive with compound (1) or compound (2) or both and
c) 5 to 90% by weight of other ethylenically unsaturated monomers, different from a) or b),
the sum of a, b, and c being 100% by weight.

2. A composition as claimed in claim 1, wherein component A is obtained by reaction of the branched soluble acrylate copolymer P with the compound (1) containing at least one activated double bond (I).

3. A composition as claimed in claim 2, wherein component b of the acrylate copolymer P is a monomer containing hydroxyl groups and the compound (1) is a monoester of an α,β-unsaturated carboxylic acid.

4. A composition as claimed in claim 2, wherein component b of the acrylate copolymer P is a monomer containing hydroxyl groups and the compound (1) is an α,β-unsaturated carboxylic acid.

5. A composition as claimed in claim 2, wherein component b of the acrylate copolymer P is a monomer containing hydroxyl groups and the compound (1) is an alkyl ester of α,β-ethylenically unsaturated carboxylic acid wherein the alkyl group contains up to 6 carbon atoms.

6. A composition as claimed in claim 1, wherein component B is obtained by reaction of the branched soluble acrylate copolymer P with the compound (2) which, in addition to a group which reacts with the acrylate copolymer, contains at least one primary amino group (II) blocked by an aldehyde or ketone having not more than 10 C atoms.

7. A composition as claimed in claim 1, wherein component A is obtained by reaction of the branched soluble acrylate copolymer P with the compound (1) containing at least one activated double bond (I); and wherein component b of the acrylated copolymer P is a monomer containing hydroxyl groups and the compound (1) contains, in addition to the group (I), an isocyanate group.

8. A composition as claimed in claim 1, wherein component A is obtained by reaction of the branched soluble acrylate copolymer P with the compound (1) containing at least one activated double bond (I); and wherein component b of the acrylate copolymer P is a monomer containing hydroxyl groups and the compound (1) is an amide, containing alkoxymethyl groups, of an α,β-unsaturated carboxylic acid, or the compound (1) corresponds to the general formula

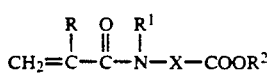

where R=H or CH$_3$,
R$^1$=H, alkyl or aryl,
R$^2$=alkyl, and

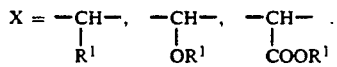

9. A composition as claimed in claim 1, wherein component A is obtained by reaction of the branched soluble acrylate copolymer P with the compound (1) containing at least one activated double bond (I); and wherein monomer b contains an epoxide group and the compound (1) contains a carbocyl or amino group.

10. A composition as claimed in claim 1, wherein component A is obtained by reaction of the branched soluble acrylate copolymer P with the compound (1) containing at least one activated double bond (I); and wherein the functional group of component b of the acrylate copolymer P is an ester containing not more than 6 carbon atoms, and the compound (1) contains, in addition to the group (I), an OH, NH, or SH group.

11. A composition as claimed in claim 1, wherein component A is obtained by reaction of the branched soluble acrylate copolymer P with the compound (1) containing at least one activated double bond (I); and wherein component b of the acrylate copolymer P contains isocyanate groups and the compound (1) contains, in addition to the group (I), OH, NH, SH or COOH groups.

12. A composition as claimed in claim 1, wherein component A is obtained by reaction of the branched soluble acrylate copolymer P with the compound (1) containing at least one activated double bond (I); and wherein component b of the acrylate copolymer P is an amide containing alkoxymethyl groups, of an α,β-unsaturated carboxylic acid or a compound of the general formula

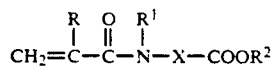

where R=H or CH₃,
R¹=H, alkyl or aryl,
R²=alkyl, and

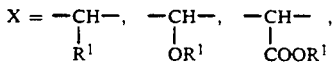

and the compound (1) contains, in addition to the groups (I), OH, NH, SH or COOH groups.

13. A composition as claimed in claim 1, wherein component B is obtained by reaction of the branched soluble acrylate copolymer P with the compound (2) which, in addition to a group which reacts with the acrylate copolymer, contains at least one primary amino group (II) blocked by an aldehyde or ketone having not more than 10 C atoms; and wherein the monomer component b is a monomer containing hydroxyl groups and the compound (2) contains, in addition to the group (II), on average 0.8 to 1.5 free isocyanate groups.

14. A composition as claimed in claim 1, wherein component B is obtained by reaction of the branched soluble acrylate copolymer P with the compound (2) which, in addition to a group which reacts with the acrylate copolymer, contains at least one primary amino group (II) blocked by an aldehyde or ketone having not more than 10 C atoms; and wherein b are monomers having glycidyl groups and (2) contains, in addition to the group (II), an NH group.

15. A composition as claimed in claim 1, wherein component B is obtained by reaction of the branched soluble acrylate copolymer P with the compound (2) which, in addition to a group which reacts with the acrylate copolymer, contains at least one primary amino group (II) blocked by an aldehyde or ketone having not more than 10 C atoms; and wherein the monomer component b contains a carboxyl group and the compound (2) is a reaction product of a polyepoxide having n mole of epoxy groups and (n−1) mole of a compound having NH groups and the group (II).

16. A composition as claimed in claim 1, wherein component B is obtained by reaction of the branched soluble acrylate copolymer P with the compound (2) which, in addition to a group which reacts with the acrylate copolymer, contains at least one primary amino group (II) blocked by an aldehyde or ketone having not more than 10 C atoms; and wherein b are monomers having isocyanate groups and (2) contains, in addition to the group (II), OH or NH groups.

17. A composition as claimed in claim 1, wherein component A is obtained by reaction of the branched soluble acrylate copolymer P with the compound (1) containing at least one activated double bond (I); and wherein component b of the acrylate copolymer is a monomer containing hydroxyl groups and compound (1) is an isocyanatoalkyl ester of unsaturated carboxylic acids, of the general formula

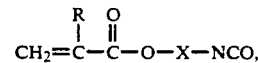

where R=H, CH₃ or C₂H₅ and X=(CH₂)ₙ where n=1-12, or the compound (1) is m-isopropenyl-α,β-dimethylbenzyl isocyanate or is chosen from the group comprising reaction products of diisocyanates with OH—, NH—, SH— or COOH-functional derivatives of acrylic acid, methacrylic acid, fumaric acid, maleic acid, crotonic acid and dimethylacrylic acid.

18. A composition as claimed in claim 1, wherein component a) corresponds to the general formula

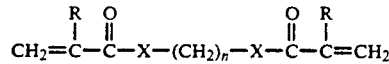

in which:
R=H or CH₃,
X=O, NR¹ or S, where R¹=H, alkyl, or aryl, and
n=2 to 8.

19. A base lacquer or a clear lacquer containing a composition as claimed in claim 1.

20. A process for the preparation of a hardenable composition containing
A) compounds having at least two activated double bonds (I) based on α,β-unsaturated carbonyl compounds or α,62 -unsaturated α,β-unsaturated nitrile groups, and
B) compounds containing either at least one primary amino group which is blocked by an aldehyde or ketone having not more than 10 C atoms or at least 2 groups which can be hydrolyzed to NH groups, which comprises first preparing a soluble, branched acrylate copolymer P by copolymerization of a) 5 to 30% by weight of monomers having at least two ethylenically unsaturated polymerizable double bonds,
b) 5 to 60% by weight of monomer having a functional group and
c) 5 to 90% by weight of other ethylenically unsaturated monomers, different from a) or b), the sum of a, b, and c being 100% by weight, in an organic solvent at 80° to 130° C. using at least 0.5% by weight, based on the total weight of monomers a, b, c, of a polymerization regulator and using polymerization initiators, a pre-crosslinked, non-gelled product being obtained, and subsequently reacting the soluble branched acrylate copolymer P with a compound (1) which, in addition to a group which can react with the acrylate copolymer P, contains at least one activated double bond (I), A being formed, and/or reacting the branched soluble acrylate copolymer P with a compound (2) which, in addition to a group which reacts with the acrylate copolymer P, contains at least one primary amino group (II) which is blocked by an aldehyde or ketone having not more than 10 C atoms, B being formed, and shortly before use mixing together A and B.

* * * * *